United States Patent
Groeber et al.

(10) Patent No.: US 6,817,184 B2
(45) Date of Patent: Nov. 16, 2004

(54) NOZZLE EXTENSION

(75) Inventors: Josef Groeber, Putzbrunn (DE); Peter Hampl, Kirchheim (DE); Herbert Linner, Germering (DE); Karl Brey, Munich (DE); Bernhard Stahn, Icking/Irschenhausen (DE)

(73) Assignee: Astrium GmbH, Munich (DE)

( * ) Notice: Subject to any disclaimer, the term of this patent is extended or adjusted under 35 U.S.C. 154(b) by 102 days.

(21) Appl. No.: 10/306,147

(22) Filed: Nov. 26, 2002

(65) Prior Publication Data

US 2003/0136128 A1 Jul. 24, 2003

(30) Foreign Application Priority Data

Nov. 27, 2001 (DE) .......................................... 101 57 752

(51) Int. Cl.$^7$ ................................................ F02K 9/97
(52) U.S. Cl. .................................... 60/770; 239/265.11
(58) Field of Search ............. 60/770, 257; 239/265.11; 102/374

(56) References Cited

U.S. PATENT DOCUMENTS

| | | | | |
|---|---|---|---|---|
| 3,648,461 A | * | 3/1972 | Bailey et al. ................. | 60/770 |
| 4,182,495 A | * | 1/1980 | Borgmeier et al. ..... | 239/265.11 |
| 4,477,024 A | * | 10/1984 | O'Driscoll et al. ..... | 239/265.11 |
| 5,540,949 A | * | 7/1996 | Grover ................... | 239/265.11 |
| 6,151,887 A | * | 11/2000 | Haidn et al. ................... | 60/257 |
| 6,324,833 B1 | * | 12/2001 | Singer et al. .................. | 60/770 |
| 6,389,801 B1 | * | 5/2002 | Papenburg et al. ........... | 60/770 |
| 6,460,807 B1 | * | 10/2002 | Braitinger et al. .......... | 102/374 |

FOREIGN PATENT DOCUMENTS

DE            197 30 674          1/1999

* cited by examiner

Primary Examiner—Michael Koczo
(74) Attorney, Agent, or Firm—Kenyon & Kenyon

(57) ABSTRACT

A nozzle extension including flange elements of C/SiC is able to be manufactured relatively simply and provides sufficient physical properties. The carbon-fiber structure of the nozzle extension is wound, and a flange for fastening the nozzle extension to the nozzle outlet of the combustion chamber is integrated in the nozzle extension by a continuous fiber flow of the wound carbon-fiber structure. The foregoing may be intended for use in rocket propulsion units.

8 Claims, 6 Drawing Sheets

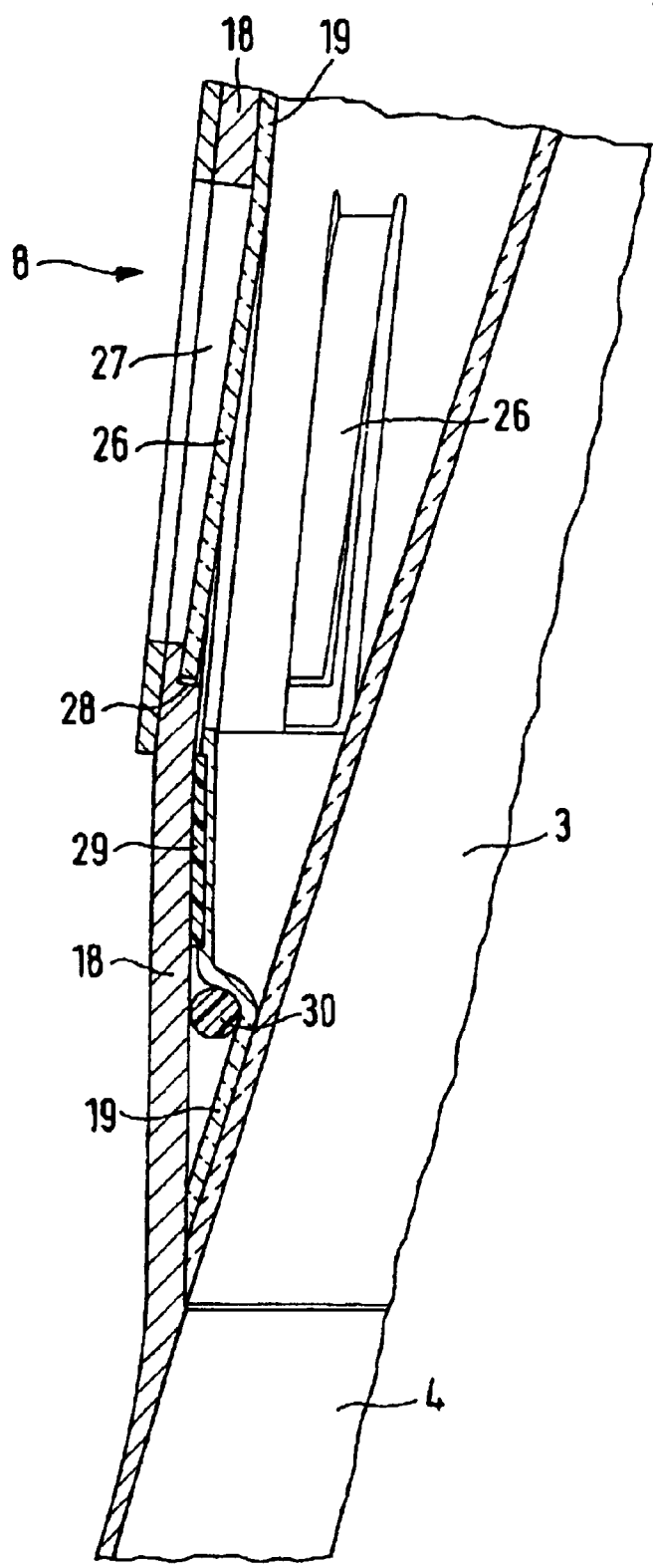

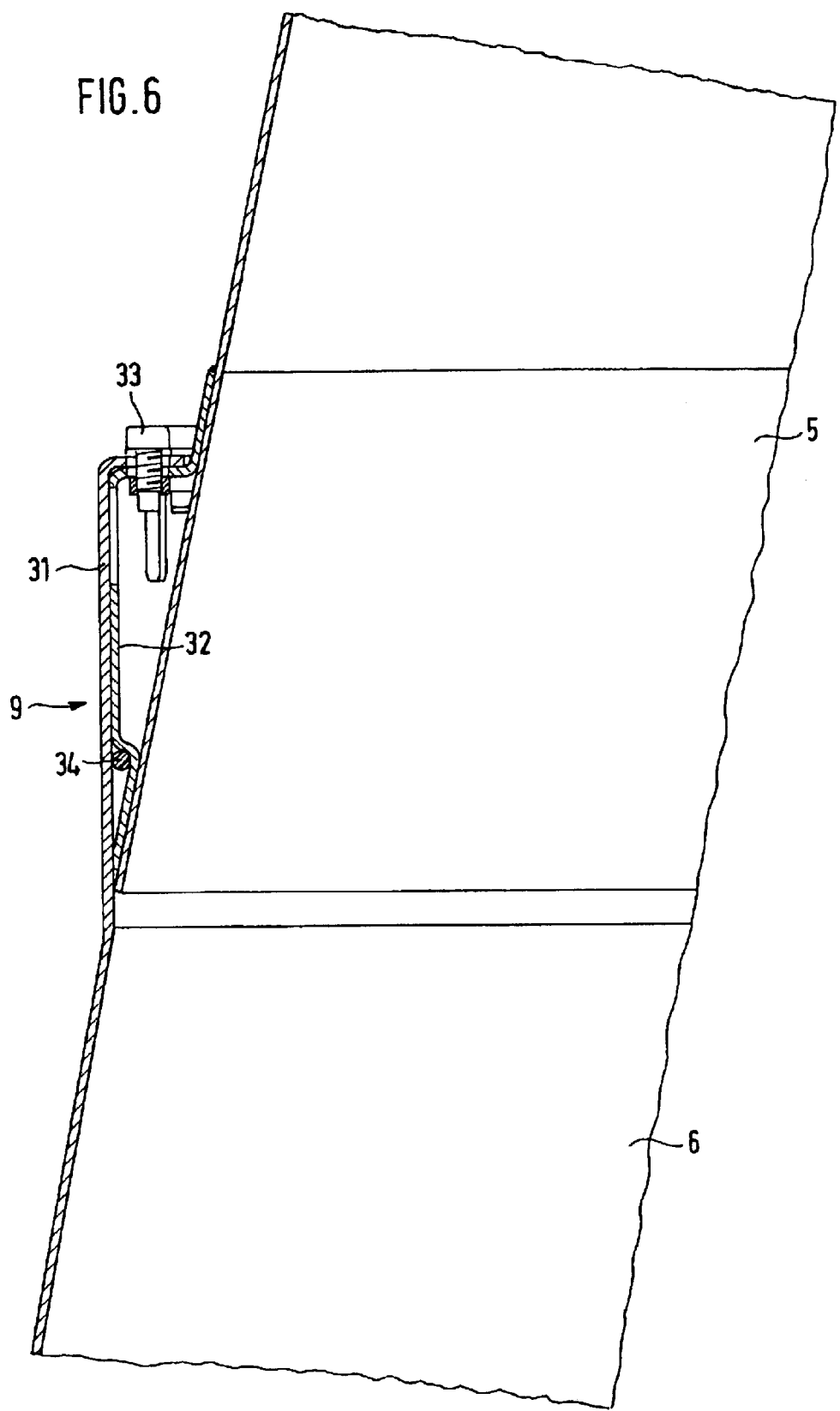

NOZZLE EXTENSION

CROSS-REFERENCE TO RELATED APPLICATIONS

The present application claims priority to Application No. 101 57 752.4, filed in the Federal Republic of Germany on Nov. 27, 2001, which is expressly incorporated herein in its entirety by reference thereto.

FIELD OF THE INVENTION

The present invention relates to a nozzle extension made of carbon ceramics for a rocket propulsion unit.

BACKGROUND INFORMATION

A method for manufacturing combustion chambers and nozzle extensions of carbon ceramics is based on the use of prefabricated fabric layers of carbon filaments. The fabric layers are placed on a form and make up the carbon-fiber structure for the combustion chamber or nozzle extension. Following placement of the fabric layers, a precursor polymer is injected into the carbon-fiber structure, and the infiltrated carbon-fiber structure is subjected to a pyrolysis. During the pyrolysis, the precursor matrix decomposes, and a fiber-reinforced carbon structure is formed. In a further step, the fiber-reinforced carbon structure is infiltrated with liquid silicon and hardened to form a ceramic silicon-carbide matrix—also described as carbon ceramics or, in short, as "C/SiC" (German Published Patent Application No. 197 30 674). It is relatively expensive to manufacture C/SiC nozzle extensions using the above described placement method, and required flange joints and other force-application or fastening elements are only able to be integrated with difficulty, with adequate strength into the nozzle extension.

It is an object of the present invention to provide a nozzle extension having flange elements of C/SiC which is able to be manufactured relatively simply and which provides sufficient physical properties.

SUMMARY

The above and other beneficial objects of the present invention are achieved by providing a nozzle extension as described herein.

The design approach in accordance with the present invention for fabricating the carbon-fiber structure of the nozzle extension utilizes the winding technique known from carbon-fiber technology, in combination with a reshaping technique, to manufacture integrated flange elements.

In the context of the application of the winding technique in accordance with the present invention, besides attaining economic advantages with respect to the manufacturing outlay, the load specifications of the nozzle extension and of its interface elements may also be considered by adapting the fiber orientation and the layer structure. It is possible, e.g., to reinforce the material by using the winding technique in the critical flange regions of the conical nozzle extension.

A further reinforcement of such locations is possible, if required, in that, additionally during the winding process, fabric layers of carbon filaments are applied and integrated between the winding layers.

In accordance with the present invention, the flanges of the nozzle extension are conically curved toward the outside and arranged as a reinforced flaring of the nozzle bushing. In this manner, there is no interruption in the fiber flow at the flange locations, so that the best possible physical properties may be derived for the thus integrated flange. The reshaping technique is thereby rendered possible without entailing substantial outlay, and a flange that is bent upwardly with an acute bending angle has elastic properties, depending on the particular form, which may be able to compensate for thermal expansions in the flange joint.

Further example embodiments of the present invention relate to engaging springs of C/SiC for locking an extensible or retractable part of a nozzle extension and to the formation of a stability ring at the outlet of a nozzle extension.

Exemplary embodiments of the present invention are described in the following on the basis of the figures.

BRIEF DESCRIPTION OF THE DRAWINGS

FIG. 5 is a schematic cross-sectional view of an enlarged detail of this connection and of the engaging springs.

FIG. 6 is a schematic cross-sectional view of the top and bottom halves of the extensible part of the nozzle extension.

DETAILED DESCRIPTION

Figure 1:
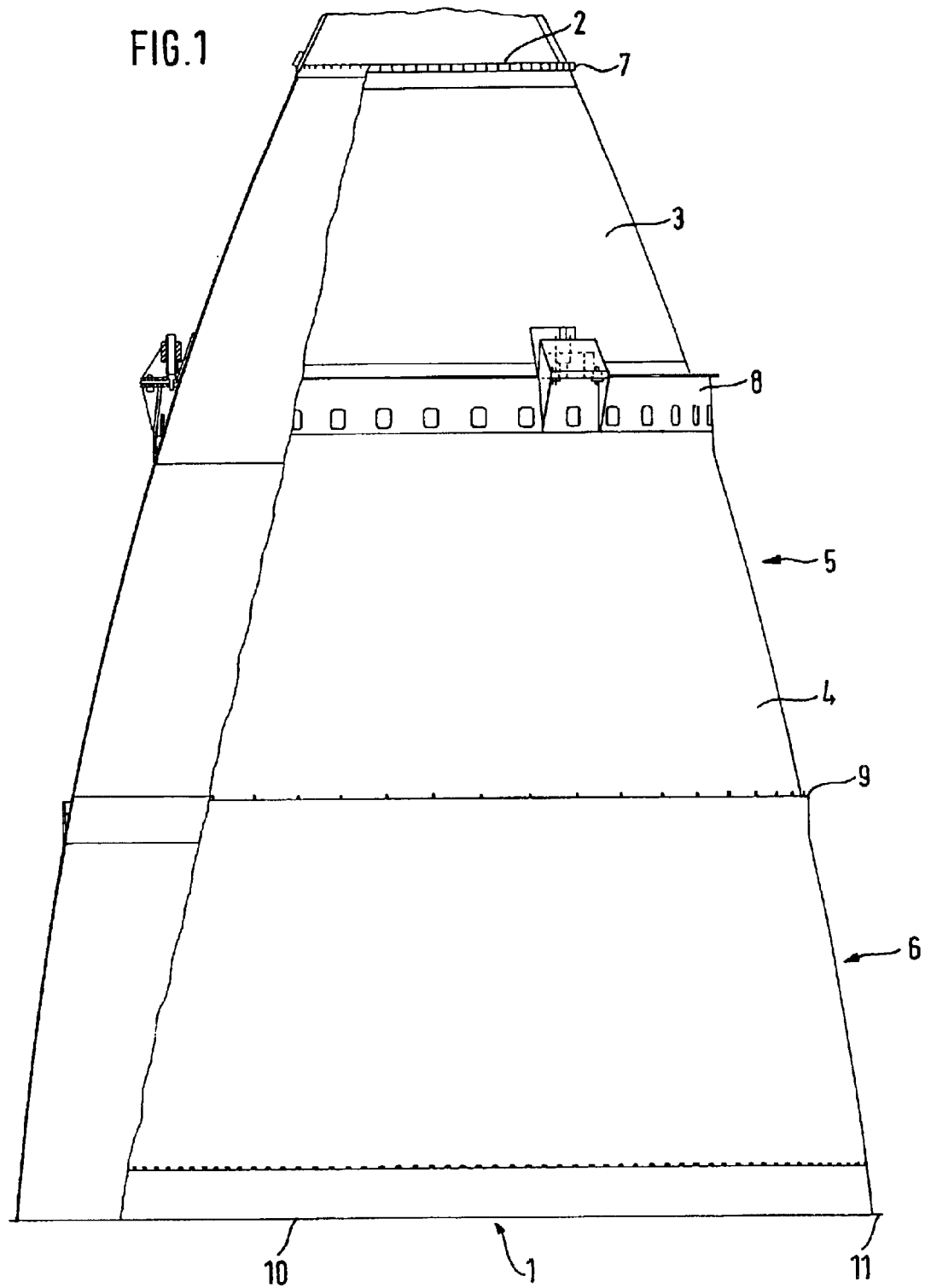
FIG. 1 illustrates a nozzle extension in accordance with the present invention.

Nozzle extension 1 illustrated in FIG. 1 is made up of a stationary nozzle part 3 and an extensible or retractable nozzle part 4. Stationary nozzle part 3 is fixedly joined by a flange joint 7 to the nozzle outlet of combustion chamber 2, and extensible or retractable nozzle part 4 is driven in outer space by a screwed-rod drive in the axial direction, out of a space-saving start position assumed at the launch of the rocket, into the extended operating position illustrated in FIG. 1, and locked at interface connection 8 between the stationary and the extensible or retractable nozzle part.

Extensible nozzle part 4 includes a top nozzle section 5 and a lower nozzle section 6, "top" nozzle section 5 being configured toward stationary nozzle part 3, and "bottom" nozzle section 6, with its exhaust port, forming nozzle outlet 10 of nozzle extension 1. Top nozzle section 5 and lower nozzle section 6 are fixedly joined to one another at interface connection 9.

In accordance with the present invention, stationary nozzle part 3, top nozzle section 5, and lower nozzle section 6 are made of wound carbon ceramics. At flange connection 7 and at interface connections 8 and 9, flanges are integrated by a widening or expanding reshaping of the carbon fiber windings into the nozzle parts. At nozzle outlet 10, the edge of bottom nozzle section 6 is crimped, so that it forms a form-stiffened stability ring 11 for the nozzle extension.

Deviating from the exemplary embodiment illustrated in FIG. 1, for one skilled in the art, the approach according to the present invention is applicable to a multiplicity of differently designed nozzle extensions, e.g., to nozzle extensions having a one-piece, extensible or retractable nozzle part, or to nozzle extensions which do not have an extensible or retractable nozzle part and are only made of one stationary nozzle part which is flange-mounted on a combustion chamber.

Figure 2:
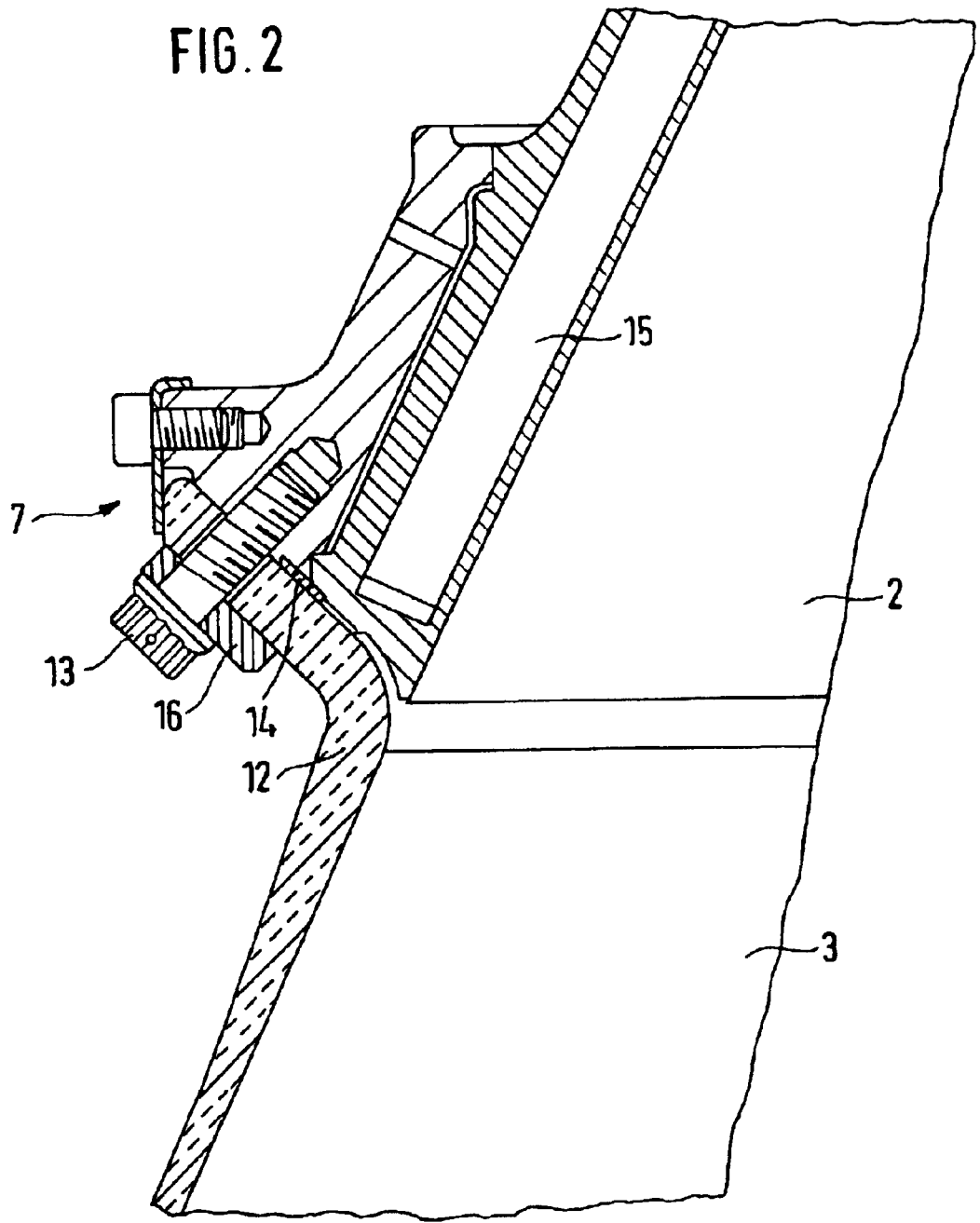
FIG. 2 is a schematic cross-sectional view of a flange joint between the combustion chamber and the nozzle extension.

Flange joint 7 illustrated in FIG. 2 between the nozzle outlet of combustion chamber 2 and stationary nozzle part 3 is illustrated in cutaway portions in FIG. 2.

The wound carbon ceramics of stationary nozzle part 3 of this exemplary embodiment is made up of 12 winding layers. The winding angle is selected in a manner which will allow the finished nozzle bushing to have a wall thickness of about 2 mm at the exhaust port of stationary nozzle part 3. Toward the intake port, due to the decreasing nozzle diameter and the associated changes in the winding structure, the wall thickness of the nozzle bushing increases to about 3 mm.

In the region of the intake port, flange 12 of flange joint 7 is produced by an outwardly bent widening of the nozzle bushing. This reshaping process is carried out with a bending angle of, for example, about 45° on the ready-wound carbon-fiber structure, prior to the injection of the precursor polymer.

In the exemplary embodiment, to reinforce flange 12, additional fabric layers of carbon filaments are inserted, during winding, into the flange, so that finished flange 12 has a wall thickness of about 6.5 mm.

Flange 12 is secured by screws 13, distributed over the flange circumference, to the nozzle outlet of combustion chamber 2. To reduce manufacturing outlay, the through holes for screws 13 are fabricated prior to the hardening of stationary nozzle part 3.

To avoid a direct contact between ceramic flange 12 and a, for example, metallic nozzle outlet of combustion chamber 2, an elastic seal 14 is provided, which is made, for example, of "Sigraflex" and is compressed upon installation of the flange joint. Due to the conical shape of flange 12, elastic seal 14 also acts as a centering aid to provide an optimally aligned, axial jointing of the combustion chamber and nozzle extension. The flange joint is constructed in a manner that allows it to be positioned closely to cooling channels 15 of the combustion chamber extending into the nozzle outlet of combustion chamber 2. In this manner, one may prevent overheated spots from developing in the flange joint.

To distribute the compressive forces exerted by screws 13 on ceramic flange 12, in the exemplary embodiment, a segment of metal 16 having through holes for the screws is provided between the screw heads and the flange.

Figure 3:
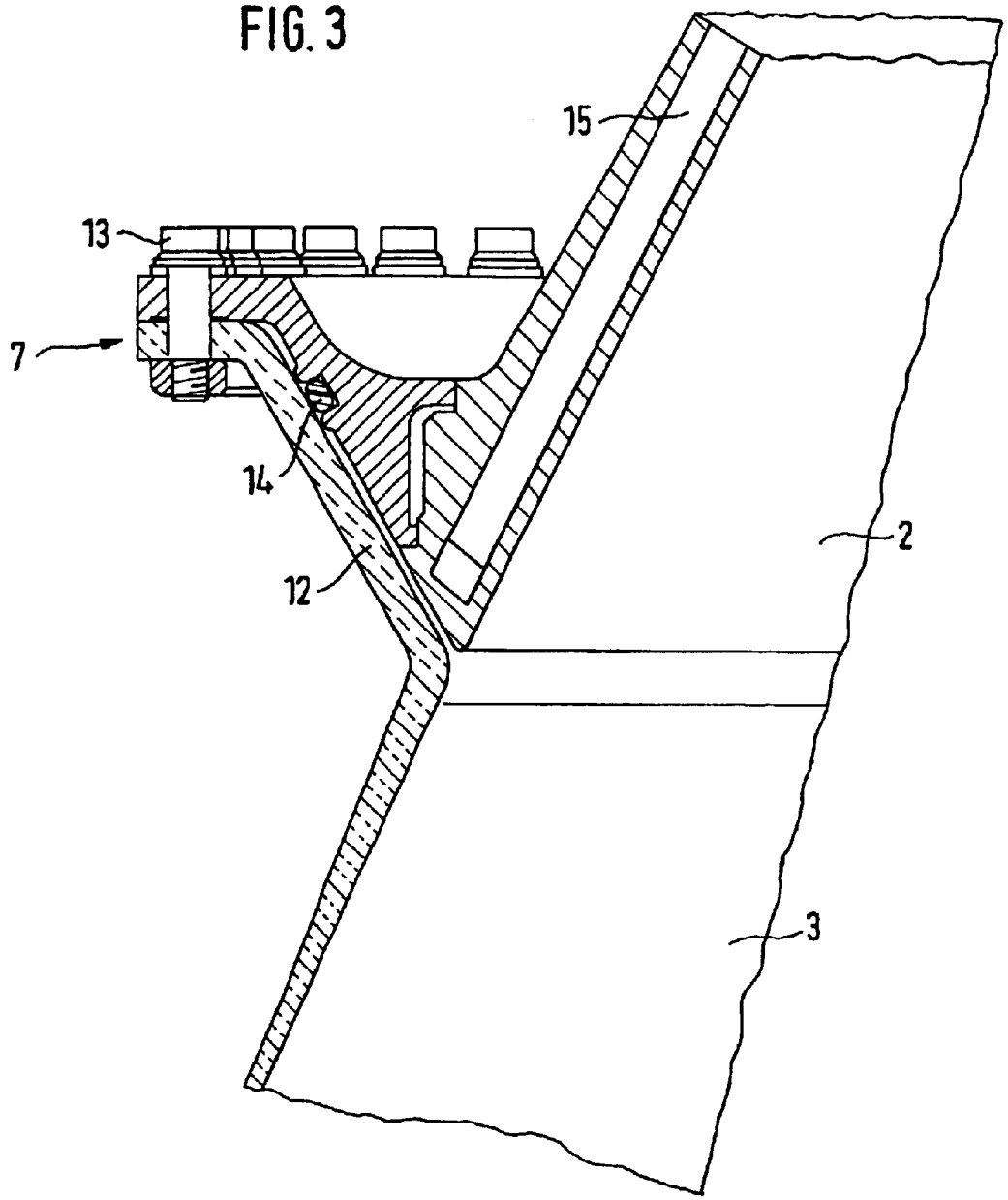
FIG. 3 is a schematic cross-sectional view of an alternative arrangement of such a flange joint.

The exemplary embodiment illustrated in FIG. 3 of an alternative arrangement of flange joint 7 differs from the flange joint illustrated in FIG. 2 in that the widened region, outwardly bent with a bending angle of, for example, about 45° in the region of the intake port, has a second, bent reshaping, so that screws 13 are able to be mounted in the axial direction. This reshaping process is carried out on the ready-wound carbon-fiber structure, prior to the injection of the precursor polymer.

An additional advantage of this flange joint is that the screw connection is positioned in a thermally favorable manner, at a greater distance from the nozzle outlet.

Deviating from the exemplary embodiments of flange joint 7 described above, one skilled in the art may provide other structural refinements having any desired positive and negative bending angles on the flange. What may be decisive for the design approach in accordance with the present invention is an integrated flange, which is manufactured by a widening reshaping process performed on the ready-wound carbon-fiber structure and is characterized by a fiber flow that continues right through to the nozzle bushing.

The carbon-fiber structure is reshaped using a winding mandrel suitably formed in the flange region for accommodating conical-ring inserts and using external tensioning and supporting rings as widening and bending tools.

Figure 4:
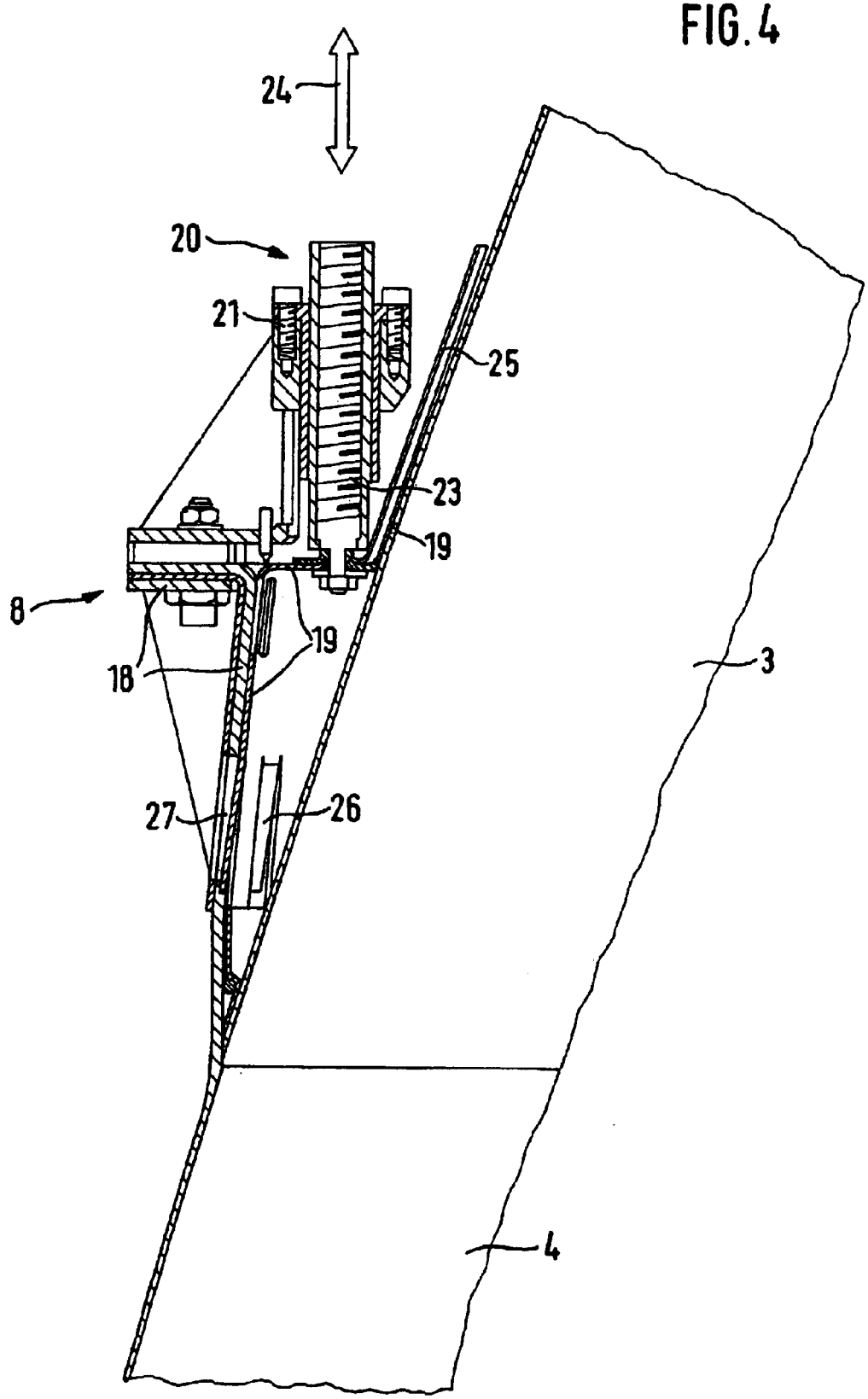
FIG. 4 is a schematic cross-sectional view of an interface connection including engaging springs between a stationary and an extensible or retractable part of a nozzle extension.

Interface connection 8, illustrated in FIG. 4, between a stationary nozzle part 3 and an extensible nozzle part 4 of a nozzle extension 1, is essentially made of a flange 18 integrated in extensible nozzle part 4, an interface ring 19, which is fixed by adhesion to stationary nozzle part 3, and a plurality of screwed-rod drives 20 distributed over the nozzle circumference. In the exemplary embodiment, three screwed-rod drives are distributed, for example, at 120° intervals on the nozzle circumference.

Integrated in interface ring 19 and distributed over the ring circumference are a plurality of engaging springs 26, which snap into corresponding catch openings 27 of the flange when extensible nozzle part reaches its extended operating position, thereby interlocking the nozzle parts in this position. Extensible nozzle part 4 is illustrated in its extended and latched-in or engaged operating position in FIG. 4.

Interface ring 19 is a prefabricated carbon-fiber structure, which is manufactured, for example, using winding technology, and which is externally fixed by adhesion "in situ", prior to the pyrolysis of stationary nozzle part 3, in the manner of a hat band, to the carbon-fiber structure of this nozzle part in the region of the exhaust port.

Flange 18 of extensible nozzle part 4 is integrated in the region of the intake port of this nozzle part. The formation of the flange is accomplished by a widening reshaping of the carbon-fiber structure into extensible nozzle part 4 in accordance with the procedure described previously for FIG. 2, and exhibits the continuous fiber flow in accordance with the present invention.

By flange 18, movable output end 21 of screwed-rod drives 20 for extending and retracting extensible nozzle part 4 in the directions of arrow of motion 24 is rigidly connected, for example, by screw connections. Threaded rod 23 of screwed-rod drives 20 is fixedly anchored by its base, in each case, to a partial section of interface ring 19 formed perpendicularly to the nozzle axis. Screwed-rod drive 20 is protected from heating by a thermal shield 25.

FIG. 5 illustrates an enlarged section of interface connection 8 in the region of engaging springs 26. Engaging springs 26 integrated in interface ring 19 are made of C/SiC. The integrated engaging springs may be manufactured, for example, in that during the manufacture of interface ring 19, small enlargements or thickened areas of carbon-fiber structure, suitably dimensioned for the engaging springs, are adhesively applied from the outside to interface ring 19. Following the subsequent hardening of the complete, stationary nozzle part 3, together with interface ring 19 that is adhesively fixed in-situ, engaging springs 26 are produced at these thickened regions using cutting-type machining. Following the cutting-type machining, they have, for example, the form of a clip, which is inserted on one side into the interface ring, and towards its free end, protrudes outwardly out of the surface of interface ring 19. Flange 18 of extensible nozzle part 4 glides in the end phase of the extension operation on interface ring 19 and presses the protruding engaging springs into the interface ring until catch openings 27 are positioned over the engaging springs, and they snap with their free ends into the openings. For purposes of a controlled positioning of latched-in engaging springs, for example, catch openings 27 are formed, for example, with a stepped limit stop 29.

A sliding seal 29 made, for example, of "Sigraflex" is provided to diminish frictional forces between flange 18 and interface ring 19, and a sealing ring 30 may ensure a sealing of interface connection 8.

Top nozzle section 5 and lower nozzle section 6 of the exemplary embodiment are fixedly joined via an interface connection 9 illustrated in FIG. 6 to one another and to extensible nozzle part 3.

Interface connection 9 includes a flange 31 integrated in lower nozzle section 6 and of an interface ring 32 adhesively fixed to top nozzle section 5.

Interface ring 32 is a prefabricated carbon-fiber structure, which is manufactured, for example, using winding technology, and which is externally fixed by adhesion "in situ", prior to the pyrolysis of top nozzle section 4, in the manner of a hat band, to the carbon-fiber structure of this nozzle part in the region of the exhaust port.

Flange 31 of lower nozzle part 6 is integrated in the region of the intake port of this nozzle part. The formation of the flange is accomplished by a widening reshaping of the carbon-fiber structure in lower nozzle section 6, in accordance with the procedure described previously for FIG. 2, and exhibits the continuous fiber flow in accordance with the present invention.

To manufacture the fixed connection of nozzle sections, flange 31 and interface ring 32 are interconnected via screw connections 33 distributed over the nozzle circumference. A sealing ring 34 provides for a sealing of interface connection 9.

What is claimed is:

1. A nozzle extension formed of carbon ceramics for a rocket propulsion unit, comprising:
    a wound carbon-fiber structure; and
    a flange configured to fasten the nozzle extension to a nozzle outlet of a combustion chamber integrated in the nozzle extension by a continuous fiber flow of the wound carbon-fiber structure;
    wherein the flange includes a conical widening of the nozzle extension.

2. A nozzle extension formed of carbon ceramics for a rocket propulsion unit, comprising:
    a wound carbon-fiber structure; and
    a flange configured to fasten the nozzle extension to a nozzle outlet of a combustion chamber integrated in the nozzle extension by a continuous fiber flow of the wound carbon-fiber structure;
    wherein the flange includes a conical widening of the nozzle extension, which includes an additional crimping configured to axially accommodate screws to secure the flange to the combustion chamber.

3. A nozzle extension formed of carbon ceramics for a rocket propulsion unit, comprising:
    a wound carbon-fiber structure; and
    a flange configured to fasten the nozzle extension to a nozzle outlet of a combustion chamber integrated in the nozzle extension by a continuous fiber flow of the wound carbon-fiber structure;
    wherein the nozzle extension includes a stationary nozzle part and an extensible nozzle part, an interface connection between the nozzle parts at the nozzle inlet of the extensible nozzle part includes a flange integrated by a continuous fiber flow in the wound carbon-fiber structure of the extensible nozzle part.

4. The nozzle extension according to claim 3, wherein the interface connection includes an interface ring of C/SiC adhesively fixed in-situ to the stationary nozzle part, and wherein C/SiC engaging springs distributed over the circumference are integrated using a cutting-type machining of the hardened interface ring.

5. The nozzle extension according to claim 4, wherein the engaging springs include clips inserted on one side into the interface ring, and toward their free end, protrude outwardly out of the surface of the interface ring.

6. The nozzle extension according to claim 3, wherein the extensible nozzle part includes a top nozzle section and a lower nozzle section, an interface connection between the nozzle sections at the nozzle inlet of the lower nozzle section includes a flange integrated with a continuous fiber flow in the wound carbon-fiber structure of the lower nozzle section.

7. A nozzle extension formed of carbon ceramics for a rocket propulsion unit, comprising:
    a wound carbon-fiber structure; and
    a flange configured to fasten the nozzle extension to a nozzle outlet of a combustion chamber integrated in the nozzle extension by a continuous fiber flow of the wound carbon-fiber structure;
    wherein the wound flange include additional fabric layers of prefabricated carbon filaments inserted into the winding.

8. A nozzle extension formed of carbon ceramics for a rocket propulsion unit, comprising:
    a wound carbon-fiber structure; and
    a flange configured to fasten the nozzle extension to a nozzle outlet of a combustion chamber integrated in the nozzle extension by a continuous fiber flow of the wound carbon-fiber structure;
    further comprising a stability ring at the nozzle outlet produced by a crimping of the wound carbon-fiber structure prior to hardening of the nozzle extension.

* * * * *